(12) United States Patent
Bouzas et al.

(10) Patent No.: US 8,706,541 B2
(45) Date of Patent: Apr. 22, 2014

(54) RESERVOIR MANAGEMENT LINKING

(75) Inventors: Horacio Ricardo Bouzas, Oslo (NO); Gregory Edward Bruce, Houston, TX (US); Tim Nguyen, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 212 days.

(21) Appl. No.: 12/555,101

(22) Filed: Sep. 8, 2009

(65) Prior Publication Data

US 2010/0084131 A1 Apr. 8, 2010

Related U.S. Application Data

(60) Provisional application No. 61/102,908, filed on Oct. 6, 2008.

(51) Int. Cl.
*G06Q 99/00* (2006.01)

(52) U.S. Cl.
USPC .................. 705/7.15; 705/7.23; 705/7.25

(58) Field of Classification Search
USPC ............................. 705/28, 8; 703/1
See application file for complete search history.

(56) References Cited

U.S. PATENT DOCUMENTS

| | | | |
|---|---|---|---|
| 5,992,519 A | 11/1999 | Ramakrishnan et al. | |
| 6,106,561 A | 8/2000 | Farmer | |
| 6,313,837 B1 | 11/2001 | Assa et al. | |
| 6,980,940 B1 | 12/2005 | Gurpinar et al. | |
| 7,248,259 B2 | 7/2007 | Fremming | |
| 7,302,436 B2 * | 11/2007 | Qubti et al. | 1/1 |
| 2001/0047332 A1 * | 11/2001 | Gonen-Friedman et al. | 705/40 |
| 2003/0216897 A1 | 11/2003 | Endres et al. | |
| 2004/0153298 A1 | 8/2004 | Colvin et al. | |
| 2004/0220846 A1 * | 11/2004 | Cullick et al. | 705/8 |
| 2005/0149307 A1 * | 7/2005 | Gurpinar et al. | 703/10 |
| 2006/0197759 A1 | 9/2006 | Fremming | |
| 2007/0112547 A1 | 5/2007 | Ghorayeb et al. | |
| 2007/0179766 A1 | 8/2007 | Cullick et al. | |

FOREIGN PATENT DOCUMENTS

| | | |
|---|---|---|
| GB | 2407184 | 4/2005 |
| WO | 9964896 | 12/1999 |
| WO | WO0077685 | 12/2000 |
| WO | WO0162603 | 8/2001 |
| WO | 2004049216 A1 | 6/2004 |
| WO | WO2004099917 | 11/2004 |
| WO | WO2006135849 | 12/2006 |
| WO | WO2007084611 | 7/2007 |

OTHER PUBLICATIONS

Search Report mailed completed on Apr. 4, 2013 and mailed on Apr. 5, 2013 by the Australian Patent Office for GC Application No. GCC/P/2009/14418 (9 pages).
Examiner's Report mailed on Jan. 18, 2013 for Canadian Patent Application No. 2,680,958 (3 pages).

* cited by examiner

*Primary Examiner* — Talia Crawley (57) ABSTRACT

A method of reservoir management linking. The method includes receiving a reservoir volume from a submitter, the reservoir volume modeling hydrocarbons in a reservoir, and determining that the submitter is authorized to submit the reservoir volume and sending notification of the reservoir volume to a first approver. The method further includes storing the reservoir volume on a storage device, receiving approval of the reservoir volume from the first approver, determining that the first approver is authorized to approve the reservoir volume, generating a standardized report associated with the reservoir volume, and displaying the standardized report.

17 Claims, 7 Drawing Sheets

RESERVOIR MANAGEMENT LINKING

CROSS-REFERENCE TO RELATED APPLICATION

This application claims priority, pursuant to 35 U.S.C. §119(e), to the filing date of U.S. Patent Application Ser. No. 61/102,908, entitled "Method and System for Reservoir Management," filed on Oct. 6, 2008, which is hereby incorporated by reference in its entirety.

BACKGROUND

Operations, such as surveying, drilling, wireline testing, completions, production, planning and field analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine whether the formations have characteristics suitable for storing fluids.

During drilling and production operations, data is typically collected for analysis and/or monitoring of the operations. Such data may include, for instance, information regarding subterranean formations, equipment, and historical and/or other data.

Data concerning the subterranean formation is collected using a variety of sources. Such formation data may be static or dynamic. Static data relates to, for instance, formation structure and geological stratigraphy that define geological structures of the subterranean formation. Dynamic data relates to, for instance, fluids flowing through the geologic structures of the subterranean formation over time. Such static and/or dynamic data may be collected to learn more about the formations and the valuable assets contained therein.

Various equipment may be positioned about the field to monitor field parameters, to manipulate the operations and/or to separate and direct fluids from the wells. Surface equipment and completion equipment may also be used to inject fluids into reservoirs, either for storage or at strategic points to enhance production of the reservoir.

SUMMARY

A method of reservoir management linking. The method includes receiving a reservoir volume from a submitter, the reservoir volume modeling hydrocarbons in a reservoir, and determining that the submitter is authorized to submit the reservoir volume and sending notification of the reservoir volume to a first approver. The method further includes storing the reservoir volume on a storage device, receiving approval of the reservoir volume from the first approver, determining that the first approver is authorized to approve the reservoir volume, generating a standardized report associated with the reservoir volume, and displaying the standardized report.

Other aspects and advantages of reservoir management linking will be apparent from the following description and the appended claims.

BRIEF DESCRIPTION OF DRAWINGS

So that the above described features and advantages of reservoir management linking can be understood in detail, a more particular description of reservoir management linking, briefly summarized above, may be had by reference to the embodiments thereof that are illustrated in the appended drawings. It is to be noted, however, that the appended drawings illustrate only typical embodiments and are therefore not to be considered limiting of its scope, for reservoir management linking may admit to other equally effective embodiments.

FIGS. 1.1-1.4 depict a simplified, schematic view of an oilfield having subterranean formations containing reservoirs therein, the various oilfield operations being performed on the oilfield.

FIGS. 3.1-3.3 are schematic, 3D views of static models based on the data acquired by the data acquisition tools of FIG. 2.

DETAILED DESCRIPTION

Specific embodiments of reservoir management linking will now be described in detail with reference to the accompanying figures. Like elements in the various figures are denoted by like reference numerals for consistency.

In the following detailed description of embodiments of reservoir management linking, numerous specific details are set forth in order to provide a more thorough understanding of reservoir management linking. In other instances, well-known features have not been described in detail to avoid obscuring the described embodiments.

Embodiments of reservoir management linking are shown in the above-identified Figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

FIGS. 1.1-1.4 depict simplified, representative, schematic views of an oilfield 100 having subterranean formation 102 containing reservoir 104 therein and depicting various oilfield operations being performed on the oilfield 100. FIG. 1.1 depicts a survey operation being performed by a survey tool, such as seismic truck 106.1, to measure properties of the subterranean formation. The survey operation is a seismic survey operation for producing sound vibrations. In FIG. 1.1, one such sound vibration 112 generated by a source 110 reflects off a plurality of horizons 114 in an earth formation 116. The sound vibration(s) 112 is are received in by sensors, such as geophone-receivers 118, situated on the earth's surface, and the geophones 118 produce electrical output signals, referred to as data received 120 in FIG. 1.1.

Figure 11:
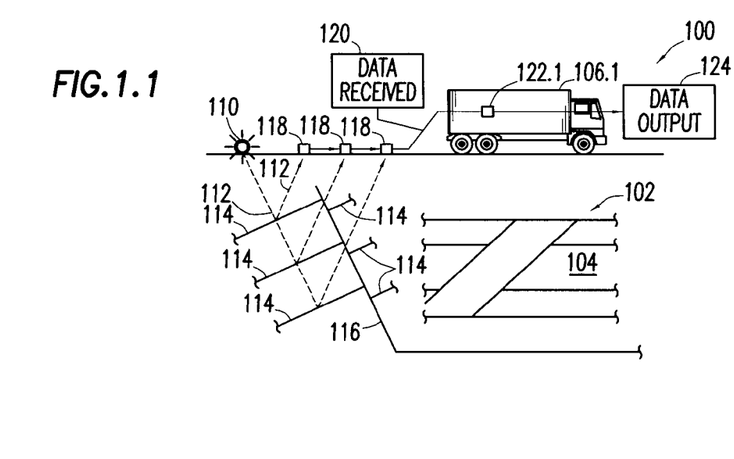

In response to the received sound vibration(s) 112 representative of different parameters (such as amplitude and/or frequency) of the sound vibration(s) 112, the geophones 118 produce electrical output signals containing data concerning the subterranean formation. The data received 120 is provided as input data to a computer 122.1 of the seismic truck 106.1, and responsive to the input data, the computer 122.1 generates a seismic data output 124. The seismic data output may be stored, transmitted or further processed as desired, for example by data reduction.

Figure 12:
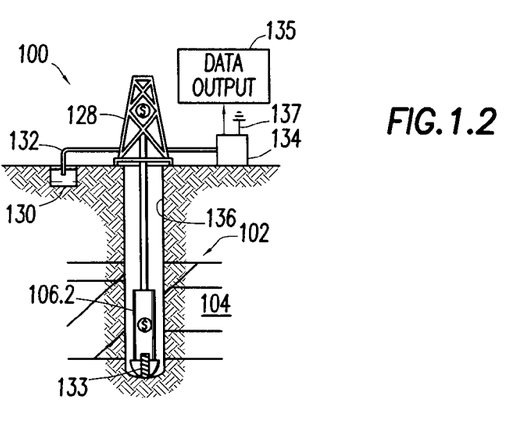

FIG. 1.2 depicts a drilling operation being performed by a drilling tools 106.2 suspended by a rig 128 and advanced into the subterranean formations 102 to form a wellbore 136. A mud pit 130 is used to draw drilling mud into the drilling tools via flow line 132 for circulating drilling mud through the drilling tools, up the wellbore 136 and back to the surface. The drilling mud is usually filtered and returned to the mud pit. A circulating system may be used for storing, controlling, or filtering the flowing drilling muds. The drilling tools are advanced into the subterranean formations to reach reservoir 104. Each well may target one or more reservoirs. The drilling tools are preferably adapted for measuring downhole properties using logging while drilling tools. The logging while drilling tool may also be adapted for taking a core sample 133 as shown, or removed so that a core sample may be taken using another tool.

A surface unit 134 is used to communicate with the drilling tools and/or offsite operations. The surface unit 134 is capable of communicating with the drilling tools to send commands to the drilling tools, and to receive data therefrom. The surface unit 134 is preferably provided with computer facilities for receiving, storing, processing, and/or analyzing data from the oilfield 100. The surface unit 134 collects data generated during the drilling operation and produces data output 135 which may be stored or transmitted. Computer facilities, such as those of the surface unit 134, may be positioned at various locations about the oilfield 100 and/or at remote locations.

Sensors (S), such as gauges, may be positioned about the oilfield 100 to collect data relating to various oilfield operations as described previously. As shown, the sensor (S) is positioned in one or more locations in the drilling tools and/or at the rig to measure drilling parameters, such as weight on bit, torque on bit, pressures, temperatures, flow rates, compositions, rotary speed and/or other parameters of the oilfield operation. Sensors may also be positioned in one or more locations in the circulating system.

The data gathered by the sensors may be collected by the surface unit 134 and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be may be historical data, real time data, or combinations thereof. The real time data may be used in real time, or stored for later use. The data may also be combined with historical data or other inputs for further analysis. The data may be stored in separate databases, or combined into a single database.

The collected data may be used to perform analysis, such as modeling operations. For example, the seismic data output may be used to perform geological, geophysical, and/or reservoir engineering. The reservoir, wellbore, surface and/or process data may be used to perform reservoir, wellbore, geological, and geophysical or other simulations. The data outputs from the oilfield operation may be generated directly from the sensors, or after some preprocessing or modeling. These data outputs may act as inputs for further analysis.

The data may be collected and stored at the surface unit 134. One or more surface units may be located at the oilfield 100, or connected remotely thereto. The surface unit 134 may be a single unit, or a complex network of units used to perform the necessary data management functions throughout the oilfield 100. The surface unit 134 may be a manual or automatic system. The surface unit 134 may be operated and/or adjusted by a user.

The surface unit 134 may be provided with a transceiver 137 to allow communications between the surface unit 134 and various portions of the oilfield 100 or other locations. The surface unit 134 may also be provided with or functionally connected to one or more controllers for actuating mechanisms at the oilfield 100. The surface unit 134 may then send command signals to the oilfield 100 in response to data received. The surface unit 134 may receive commands via the transceiver or may itself execute commands to the controller. A processor may be provided to analyze the data (locally or remotely), make the decisions, and/or actuate the controller. In this manner, the oilfield 100 may be selectively adjusted based on the data collected. This technique may be used to optimize portions of the oilfield operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 13:
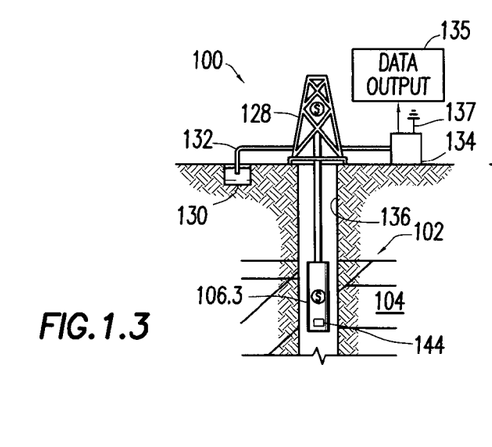

FIG. 1.3 depicts a wireline operation being performed by a wireline tool 106.3 suspended by the rig 128 and into the wellbore 136 of FIG. 1.2. The wireline tool is preferably adapted for deployment into a wellbore for generating well logs, performing downhole tests, and/or collecting samples. The wireline tool may be used to provide another method and apparatus for performing a seismic survey operation. The wireline tool of FIG. 1.3 may, for example, have an explosive, radioactive, electrical, or acoustic energy source 144 that sends and/or receives electrical signals to the surrounding subterranean formations 102 and fluids therein.

The wireline tool may be operatively connected to, for example, the geophones 118, and the computer 122.1 of the seismic truck 106.1 of FIG. 1.1. The wireline tool may also provide data to the surface unit 134. The surface unit 134 collects data generated during the wireline operation and produces data output 135 which may be stored or transmitted. The wireline tool may be positioned at various depths in the wellbore to provide a survey or other information relating to the subterranean formation.

Sensors (S), such as gauges, may be positioned about the oilfield 100 to collect data relating to various oilfield operations as described previously. As shown, the sensor (S) is positioned in the wireline tool to measure downhole parameters which relate to, for example porosity, permeability, fluid composition and/or other parameters of the oilfield operation.

Figure 14:
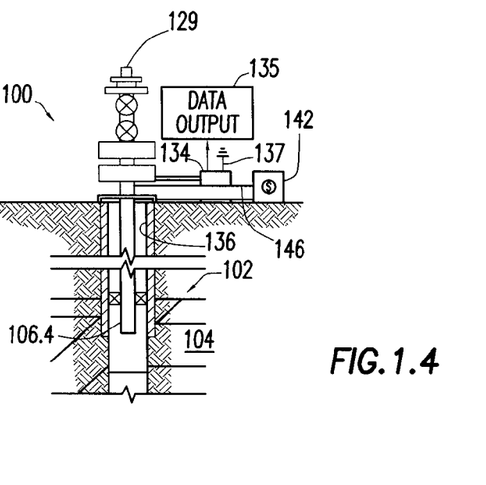

FIG. 1.4 depicts a production operation being performed by a production tool 106.4 deployed from a production unit or Christmas tree 129 and into the completed wellbore 136 of FIG. 1.3 for drawing fluid from the downhole reservoirs into surface facilities 142. Fluid flows from reservoir 104 through perforations in the casing (not shown) and into the production tool 106.4 in the wellbore 136 and to the surface facilities 142 via a gathering network 146.

Sensors (S), such as gauges, may be positioned about the oilfield 100 to collect data relating to various oilfield operations as described previously. As shown, the sensor (S) may be positioned in the production tool 106.4 or associated equipment, such as the Christmas tree, gathering network, surface facilities and/or the production facility, to measure fluid parameters, such as fluid composition, flow rates, pressures, temperatures, and/or other parameters of the production operation.

While only simplified wellsite configurations are shown, it will be appreciated that the oilfield 100 may cover a portion of land, sea, and/or water locations that hosts one or more wellsites. Production may also include injection wells (not shown) for added recovery. One or more gathering facilities may be operatively connected to one or more of the wellsites for selectively collecting downhole fluids from the wellsite(s).

While FIGS. 1.2-1.4 depict tools used to measure properties of an oilfield, it will be appreciated that the tools may be used in connection with non-oilfield operations, such as mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The oilfield configuration of FIGS. 1.1-1.4 is intended to provide a brief description of an example of an oilfield usable with reservoir management linking. Part, or all, of the oilfield 100 may be on land, water, and/or sea. Also, while a single oilfield measured at a single location is depicted, reservoir management linking may be used with any combination of one or more oilfields, one or more processing facilities, and one or more wellsites.

Figure 2:
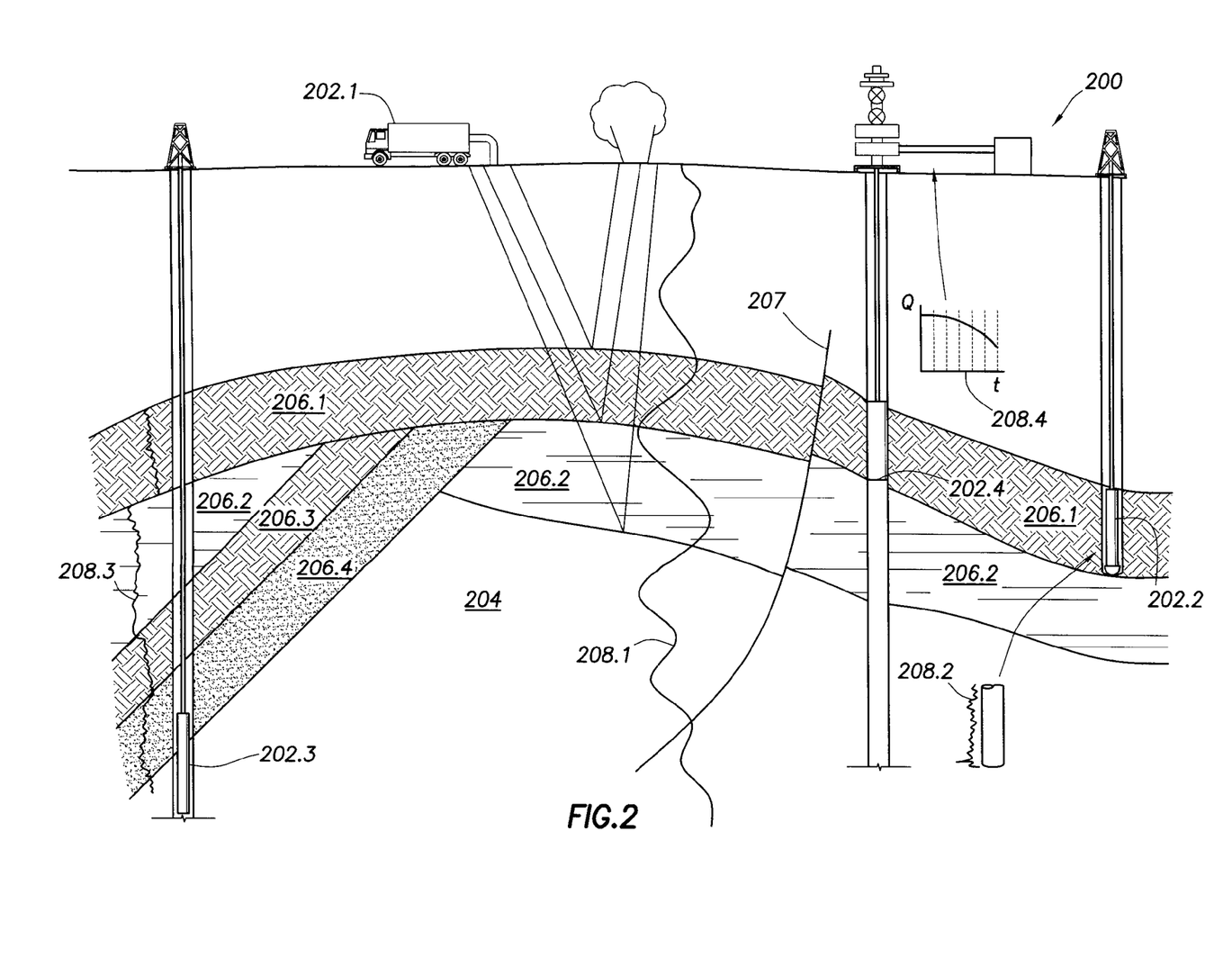
FIG. 2 is a schematic view, partially in cross section of an oilfield having a plurality of data acquisition tools positioned at various locations along the oilfield for collecting data from the subterranean formations.

FIG. 2 is a schematic view, partially in cross section of an oilfield 200 having data acquisition tools 202.1, 202.2, 202.3 and 202.4 positioned at various locations along the oilfield 200 for collecting data of the subterranean formation 204. The data acquisition tools 202.1-202.4 may be the same as data acquisition tools 106.1-106.4 of FIGS. 1.1-1.4, respectively, or others not depicted. As shown, the data acquisition tools 202.1-202.4 generate data plots or measurements 208.1-202.4, respectively. These data plots are depicted along the oilfield 200 to demonstrate the data generated by the various operations.

Data plots 208.1-208.3 are examples of static data plots that may be generated by the data acquisition tools 202.1-202.4, respectively. Static data plot 208.1 is a seismic two-way response time. Static plot 208.2 is core sample data measured from a core sample of the formation 204. Static data plot 208.3 is a logging trace. Production decline curve or graph 208.4 is a dynamic data plot of the fluid flow rate over time. Other data may also be collected, such as historical data, user inputs, economic information and/or other measurement data and other parameters of interest.

The subterranean structure 204 has a plurality of geological formations 206.1-d. As shown, the structure has several formations or layers, including a shale layer 206.1, a carbonate layer 206.2, a shale layer 206.3, and a sand layer 206.4. A fault 207 extends through the layers 206.1, 206.2. The static data acquisition tools are preferably adapted to take measurements and detect characteristics of the formations.

While a specific subterranean formation with specific geological structures is depicted, it will be appreciated that the oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the oilfield 200, it will be appreciated that one or more types of measurement may be taken at one or more location across one or more oilfields or other locations for comparison and/or analysis.

The data collected from various sources, such as the data acquisition tools of FIG. 2, may then be processed and/or evaluated. Typically, seismic data displayed in the static data plot 208.1 from the data acquisition tool 202.1 is used by a geophysicist to determine characteristics of the subterranean formations and features. Core data shown in static plot 208.2 and/or log data from the well log 208.3 are typically used by a geologist to determine various characteristics of the subterranean formation. Production data from the graph 208.4 is typically used by the reservoir engineer to determine fluid flow reservoir characteristics. The data analyzed by the geologist, geophysicist and the reservoir engineer may be analyzed using modeling techniques. Examples of modeling techniques are described in U.S. Pat. No. 5,992,519, WO2004/049216, WO1999/064896, U.S. Pat. No. 6,313,837, US2003/0216897, U.S. Pat. No. 7,248,259, US2005/0149307 and US2006/0197759. Systems for performing such modeling techniques are described, for example, in issued U.S. Pat. No. 7,248,259, the entire contents of which is hereby incorporated by reference.

FIGS. 3.1-3.4 depict three-dimensional graphical representations of the subsurface referred to as a static model. The static model may be generated based on one or more of the models generated from, for example, the data gathered using the data acquisition tools 202.1-202.4. In the figures provided, the static models 302.1-302.3 are generated by the data acquisition tools 202.1-202.3 of FIG. 2, respectively. These static models may provide a bi-dimensional view of the subterranean formation, based on the data collected at the given location.

Figure 31:
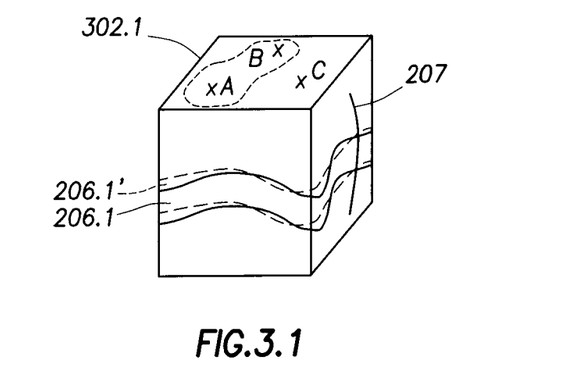
Figure 32:
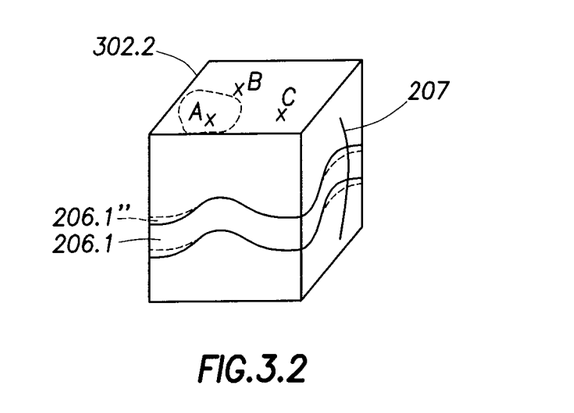
Figure 33:
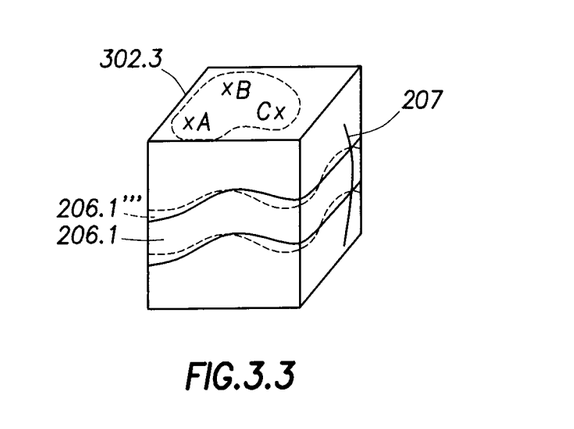

The static models may have different accuracies based on the types of measurements available, quality of data, location, and other factors. While the static models of FIGS. 3.1-3.3 are taken using certain data acquisition tools at a single location of the oilfield, one or more of the same or different data acquisition tools may be used to take measurements at one or more locations throughout the oilfield to generate a variety of models. Various analysis and modeling techniques may be selected depending on the desired data type and/or location.

Each of the static models 302.1-302.3 is depicted as volumetric representations of an oilfield with one or more reservoirs, and their surrounding formation structures. These volumetric representations are a prediction of the geological structure of the subterranean formation at the specified location based upon available measurements. Preferably, the representations are probable scenarios, created using the same input data (historical and/or real time), but having differing interpretation, interpolation, and modeling techniques. As shown, the static models contain geological layers within the subterranean formation. In particular, fault 207 of FIG. 2 extends through each of the models. Each static model also has reference points A, B and C located at specific positions along each of the static models. These static models and the specific reference points of the static models may be analyzed. For example, a comparison of the different static models may show differences in the structure of fault 207 and the adjacent layer 206.1. Each of the reference points may assist in the comparison between the various static models. Adjustments may be made to the models based on an analysis of the various static models in FIGS. 3.1-3.3, and an adjusted formation layer may be generated as will be described further below.

Figure 4:
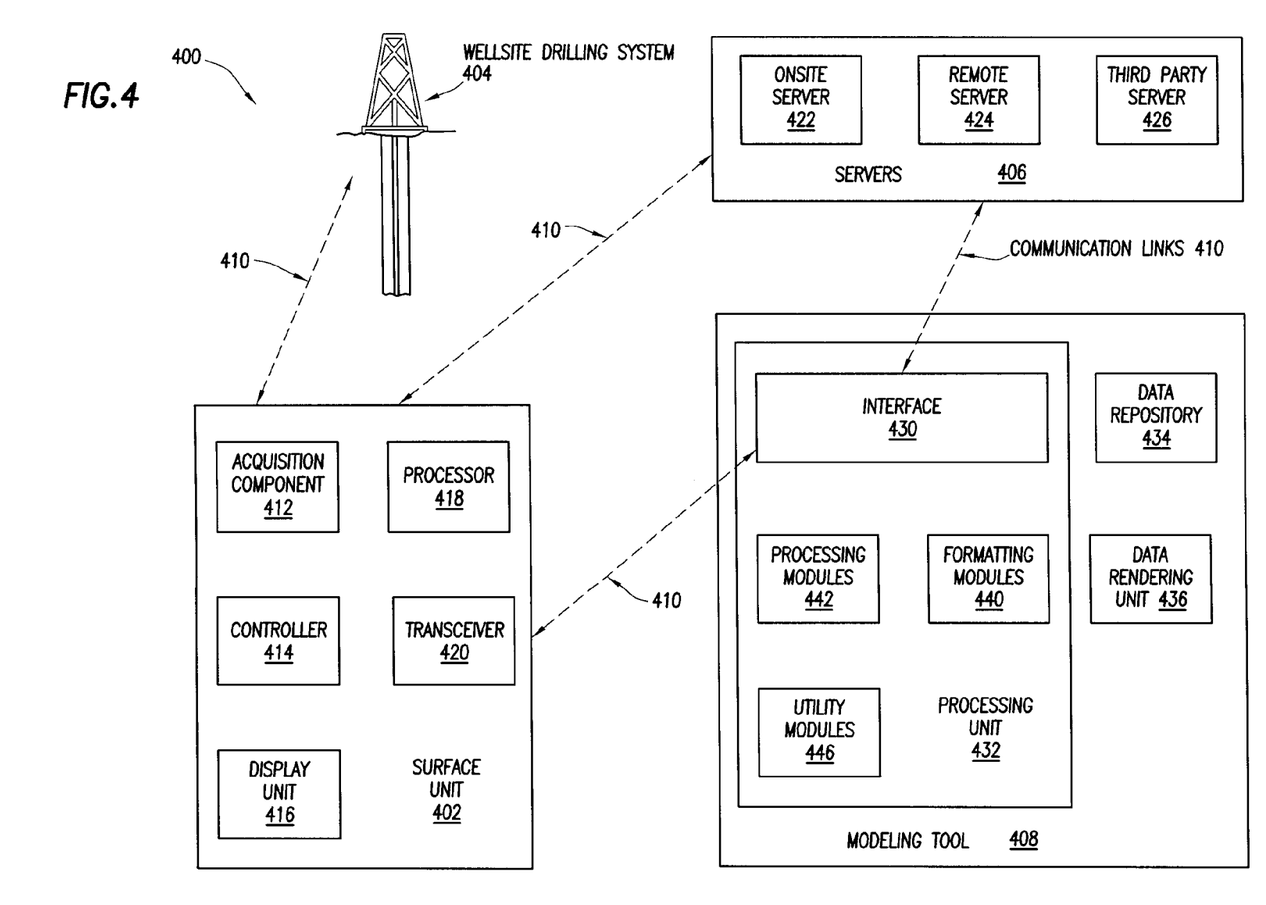
FIGS. 4-5 show exemplary schematic diagrams of systems for performing an oilfield operation.

FIG. 4 is a schematic view of a system 400 for performing an oilfield operation. As shown, the system 400 includes a surface unit 402 operatively connected to a wellsite drilling system 404, servers 406 operatively linked to the surface unit 402, and a modeling tool 408 operatively linked to the servers

406. As shown, communication links 410 are provided between the wellsite drilling system 404, surface unit 402, servers 406, and modeling tool 408. A variety of links may be provided to facilitate the flow of data through the system. For example, the communication links 410 may provide for continuous, intermittent, one-way, two-way, and/or selective communication throughout the system 400. The communication links 410 may be of any type, such as wired, wireless, etc.

The wellsite drilling system 404 and surface unit 402 may be the same drilling system and surface unit of FIGS. 1.2-1.3. The surface unit 402 is preferably provided with an acquisition component 412, a controller 414, a display unit 416, a processor 418, and a transceiver 420. The acquisition component 412 collects and/or stores data of the oilfield. This data may be data measured by the sensors (S) of the wellsite as described with respect to FIGS. 1.1-1.4. This data may also be data received from other sources. The data may also be stored on a computer readable medium such as a compact disk, DVD, optical media, volatile storage, non-volatile storage, or any other medium configured to store the data.

The controller 414 is enabled to enact commands at the oilfield. The controller 414 may be provided with an actuation mechanism that can perform oilfield operations, such as steering, advancing, or otherwise taking action at the wellsite. Commands may be generated based on logic of the processor 418, or by commands received from other sources. The processor 418 is preferably provided with features for manipulating and analyzing the data. The processor 418 may be provided with additional functionality to perform oilfield operations.

A display unit 416 may be provided at the wellsite and/or remote locations for viewing oilfield data (not shown). The oilfield data represented by a display unit 416 may be raw data, processed data and/or data outputs generated from various data. The display unit 416 is preferably adapted to provide flexible views of the data, so that the screens depicted may be customized as desired. A user may determine the desired course of action during drilling based on reviewing the displayed oilfield data. The oilfield operation may be selectively adjusted in response to the display unit 416. The display unit 416 may include a two-dimensional display for viewing oilfield data or defining oilfield events. For example, the two-dimensional display may correspond to an output from a printer, plot, a monitor, or another device configured to render two dimensional output. The display unit 416 may also include a three-dimensional display for viewing various aspects of the oilfield operation. At least some aspect of the oilfield operation is preferably viewed in real time in the three-dimensional display. For example, the three-dimensional display may correspond to an output from a printer, plot, a monitor, or another device configured to render three dimensional output.

The transceiver 420 is configured to for provide data access to and/or from other sources. The transceiver 420 is also configured to enable communication with other components, such as the servers 406, the wellsite drilling system 404, surface unit 402, and/or the modeling tool 408.

The servers 406 may be used to transfer data from one or more wellsites to the modeling tool 408. As shown, the server 406 includes onsite servers 422, a remote server 424, and a third-party server 426. The onsite servers 422 may be positioned at the wellsite and/or other adjacent locations for distributing data from the surface unit 402. The remote server 424 is positioned at a location away from the oilfield and provides data from remote sources. The third-party server 426 may be onsite or remote, but is operated by a third-party, such as a client.

The servers 406 are preferably capable of transferring drilling data (e.g., logs), drilling events, trajectory, and/or other oilfield data (e.g., seismic data, historical data, economics data, or other data that may be of use during analysis). The type of server is not intended to limit reservoir management linking. Preferably the system is adapted to function with any type of server that may be employed.

The servers 406 communicate with the modeling tool 408 as indicated by the communication links 410. As indicated by the multiple arrows, the servers 406 may have separate communication links 410 with the modeling tool 408. One or more of the servers 406 may be combined or linked to provide a combined communication link 410.

The servers 406 collect a wide variety of data. The data may be collected from a variety of channels that provide a certain type of data, such as well logs. The data from the servers 406 is passed to the modeling tool 408 for processing. The servers 406 may also be used to store and/or transfer data.

The modeling tool 408 is operatively linked to the surface unit 402 for receiving data therefrom. In some cases, the modeling tool 408 and/or server(s) 406 may be positioned at the wellsite. The modeling tool 408 and/or server(s) 406 may also be positioned at various locations. The modeling tool 408 may be operatively linked to the surface unit via the server(s) 406. The modeling tool 408 may also be included in or located near the surface unit 402.

The modeling tool 408 includes an interface 430, a processing unit 432, a data repository 434, and a data rendering unit 436. The interface 430 communicates with other components, such as the servers 406. The interface 430 may also permit communication with other oilfield or non-oilfield sources. The interface 430 receives the data and maps the data for processing. Data from servers 406 typically streams along predefined channels which may be selected by the interface 430.

As depicted in FIG. 4, the interface 430 selects the data channel of the server(s) 406 and receives the data. The interface 430 also maps the data channels to data from the wellsite. The interface 430 may also receive data from a data file (i.e., an extensible markup language (XML) file, a dBase file, or some other data file format). The data may then be passed to the processing modules 442 of the modeling tool 408. The data may be immediately incorporated into the modeling tool 408 for real-time sessions or modeling. The interface 430 creates data requests (for example surveys, logs and risks), displays the user interface, and handles connection state events. The interface 430 also instantiates the data into a data object for processing. The interface 430 may receive a request from at the surface unit 402 to retrieve data from the servers 406, the well unit, and/or data files.

The processing unit 432 includes formatting modules 440, processing modules 442, and utility modules 446. These modules are designed to manipulate the oilfield data for real-time analysis.

The formatting modules 440 are used to conform the data to a desired format for processing. Incoming data may need to be formatted, translated, converted, or otherwise manipulated for use. The formatting modules 440 are configured to enable the data from a variety of sources to be formatted and used so that the data processes and displays in real time.

The utility modules 446 provide support functions to the drilling system. The utility modules 446 include the logging component (not shown) and the user interface (UI) manager component (not shown). The logging component provides a common call for all logging data. The logging component allows the logging destination to be set by the application. The logging component may also be provided with other features, such as a debugger, a messenger, and a warning system, among others. The debugger sends a debug message to those using the system. The messenger sends information to subsystems, users, and others. The information may or may not interrupt the operation and may be distributed to various locations and/or users throughout the system. The warning system may be used to send error messages and warnings to various locations and/or users throughout the system. In some cases, the warning messages may interrupt the process and display alerts.

The UI manager component creates user interface elements for displays. The UI manager component defines user input screens, such as menu items, context menus, toolbars, and settings windows. The user manager component may also be used to handle events relating to these user input screens.

The processing module 442 may be used to analyze the data and generate outputs. As described above, the data may include static data, dynamic data, historic data, real-time data, or other types of data. Further, the data may relate to various aspects of the oilfield operations, such as formation structure, geological stratigraphy, core sampling, well logging, density, resistivity, fluid composition, flow rate, downhole condition, surface condition, equipment condition, or other aspects of the oilfield operations.

The processing modules 442 may be used to analyze these data for generating an earth model. For example, seismic data or a well trajectory may be defined from analyzing these data. Seismic data may be obtained by a seismic truck, such as that described in FIG. 1.1, for an area of interest in the subsurface. Further, a well trajectory may include well log data as collected by the well logging tools of FIGS. 1.1-1.4. Examples of well log data include acoustic impedance, density, porosity, resistivity, etc., at various depths of the well trajectory.

The data repository 434 may store the data for the modeling tool 408. The data may be stored in a format available for use in real-time (e.g., information is updated at approximately the same rate the information is received). The data is generally passed to the data repository from the processing component. The data may be persisted in the file system (e.g., as an extensible markup language XML file) or in a database. The system 400 may determine which storage is the most appropriate to use for a given piece of data and stores the data in a manner to enable automatic flow of the data through the rest of the system in a seamless and integrated fashion. The system 400 may also facilitate manual and automated workflows (such as Modeling, Geological & Geophysical workflows) based upon the persisted data.

The data rendering unit 436 performs rendering algorithm calculation to provide one or more displays for visualizing the data. The displays may be presented to a user at the display unit 416. The data rendering unit 436 may include a two-dimensional canvas, a three-dimensional canvas, a well section canvas, or other canvases as desired.

The data rendering unit 436 may selectively provide displays composed of any combination of one or more canvases. The canvases may or may not be synchronized with each other during display. The data rendering unit 436 may be provided with mechanisms for actuating various canvases or other functions in the system. Further, the data rendering unit 436 may be configured to provide displays representing the oilfield events generated from the real-time drilling data acquired in real-time during drilling, the oilfield events generated from historic data of neighboring wellbores compiled over time, the current trajectory of the wellbore during drilling, the earth model generated from static data of subterranean geological features, and/or any combinations thereof. In addition, the data rendering unit 436 may be configured to selectively adjust the displays based on real-time drilling data such as the drilling tool of the drilling system 404 advances into a subterranean formation.

While specific components are depicted and/or described for use in the units and/or modules of the modeling tool 408, it will be appreciated that a variety of components with various functions may be used to provide the formatting, processing, utility and coordination functions necessary to provide real-time processing in the modeling tool 408. The components may have combined functionalities and may be implemented as software, hardware, firmware, or combinations thereof.

Further, components (e.g., the processing modules 442 and the data rendering unit 436) of the modeling tool 408 may be located in an onsite server 422 or in distributed locations where remote server 424 and/or third-party server 426 may be involved. The onsite server 422 may be located within the surface unit 402.

Figure 5:
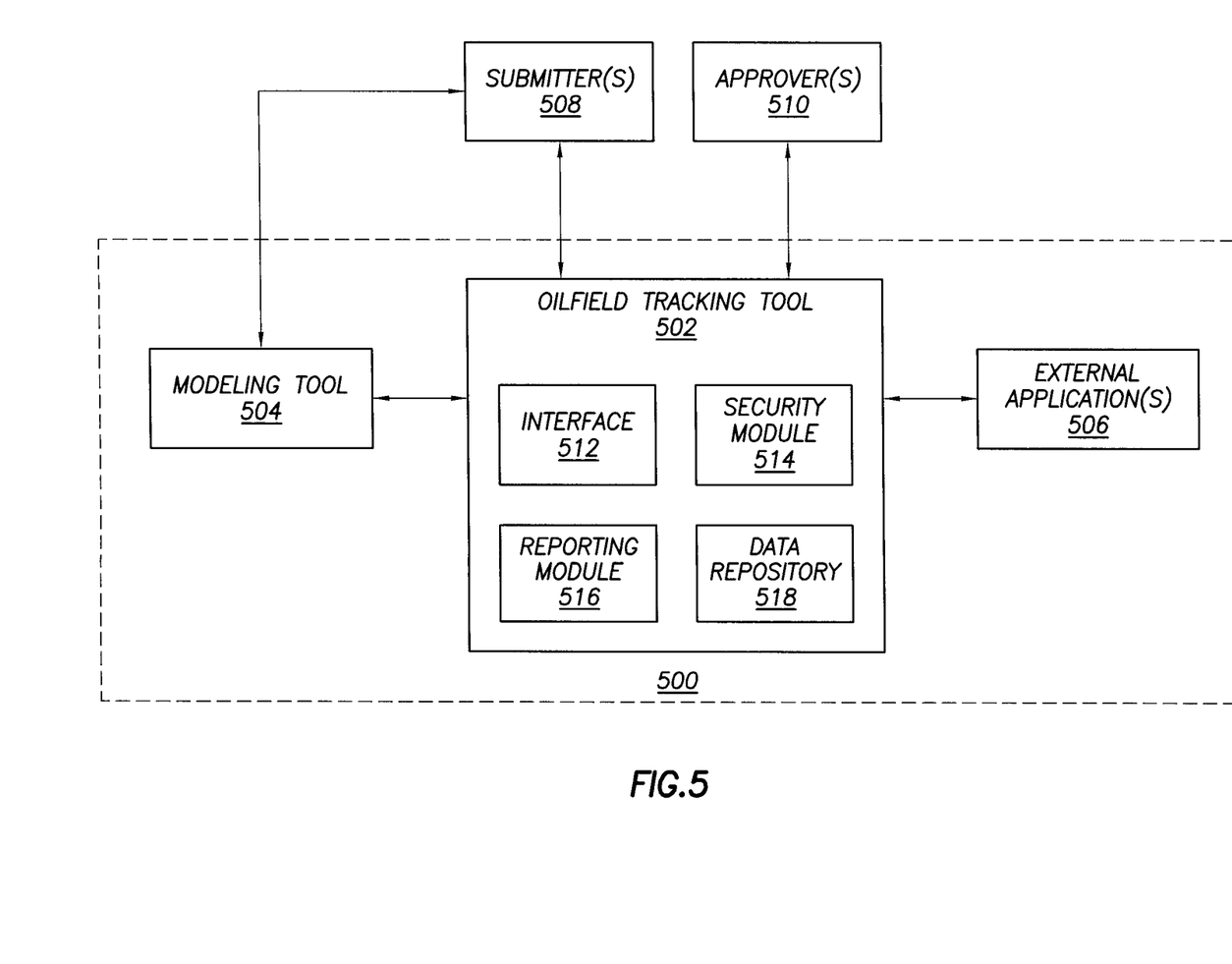

FIG. 5 is a schematic view of a system 500 for performing an oilfield operation. As shown, the system 500 includes an oilfield tracking tool 502 operatively connected to a modeling tool 504 and external application(s) 506. The modeling tool 504 may provide substantially the same functionality as the modeling tool of FIG. 4. Also shown are submitter(s) 508 interacting with the modeling tool 504 and the oilfield tracking tool 502 and approver(s) 510 interacting with the oilfield tracking tool 502.

The modeling tool 504 may be used by submitter(s) 508 to generate earth models as described in FIG. 4. For example, the modeling tool 504 may be used to generate a reservoir volume modeling hydrocarbons in the subsurface. In this example, the submitter(s) 508 may submit the reservoir volume to the oilfield tracking tool 502 using the modeling tool 504. In another example, the submitter(s) 508 may use the modeling tool 504 to generate the reservoir volume and then submit the reservoir volume directly to the oilfield tracking tool 502. Further, the submitter(s) 508 may use the modeling tool 504 to define geologic properties of a reservoir in a reservoir volume.

Submitter(s) 508 may be users of the oilfield tracking tool 502 responsible for submitting reservoir volume(s). The submitter(s) 508 may also be required to submit appropriate security credentials to the oilfield tracking tool 502. For example, security credentials may be submitted as login information for a company directory (e.g., Lightweight Directory Access Protocol (LDAP), Active Directory, etc.). In another example, security credentials may be submitted using a security device (e.g., smart card, etc.). Examples of submitter(s) 508 include, but are not limited to, an asset team, a reservoir engineer, and a geologist.

Approver(s) 510 may be users of the oilfield tracking tool 502 responsible for approving reservoir volume(s). The approver(s) 510 may also be required to submit appropriate security credentials to the oilfield tracking tool 502. For example, security credentials may be submitted as login information in a company directory (e.g., Lightweight Directory Access Protocol (LDAP), Active Directory, etc.). In another example, security credentials may be submitted using a security device (e.g., smart card, etc.). In some cases, approver(s) 510 may be supervisor(s) of submitter(s) 508. For example, an approver 510 may be a chief reservoir engineer responsible for multiple asset teams.

In some cases, the submitter(s) 508 and approver(s) 510 may access the oilfield tracking tool 502 through a remote device (e.g., cellular phone, laptop, remote desktop computer, etc.).

In some cases, the oilfield tracking tool 502 may be positioned at a wellsite. The oilfield tracking tool 502 may also be positioned at various locations. The oilfield tracking tool 502 may be operatively linked to a surface unit (not shown). The surface unit may be the same as the surface unit described in FIGS. 1.2-1.3 and 4. The oilfield tracking tool 502 may also be included in or located near the surface unit.

The oilfield tracking tool 502 includes an interface 512, a security module 514, a reporting module 516, and a data repository 518. The oilfield tracking tool 502 may use the interface 514 to communicate with other components, such as the modeling tool 504. The interface 512 may also permit communication with other oilfield or non-oilfield sources. For example, the interface 512 may be configured to obtain data from server(s) as described in FIG. 4.

The interface 512 may also receive data from a data file (i.e., an extensible markup language XML file, a dBase file, or some other data file format). The data may then be passed to the oilfield tracking tool 502. The data may be immediately incorporated into the data repository 518 for real-time sessions or modeling.

The interface 512 may be configured to receive reservoir volumes. For example, the interface 512 may receive a reservoir volume from a modeling tool 504. In another example, the interface 512 may provide a user (e.g., submitter(s) 508, etc.) with functionality to define a reservoir volume. The interface 512 may also be configured to allow a user (e.g., approver(s) 510) to approve reservoir volumes. For example, the interface 512 may present reservoir volume information to an approver 510. In this example, the approver 510 may use the interface to approve the reservoir volume information. In some cases, a reservoir volume may be approved by a number of approvers 510 before the reservoir volume may be published.

In one or more embodiments, the approver(s) 510 may review the reservoir volume based on internal company requirements. In this case, reservoir volumes approved by the approver(s) 510 may be included in non-regulatory reports generated by the reporting module 516. Further, once the internal company requirements are satisfied, the approver(s) 510 may then submit the reservoir volume for publication.

Once a reservoir volume is approved for publication, the interface 512 may be configured to publish the reservoir volume in accordance with disclosure regulations. In this case, the approved reservoir volume may be used in standardized reports created by the reporting module 516. For example, the standardized reports may be compliant with disclosure regulations associated with a variety of entities (e.g., Securities and Exchange Commission ("SEC"), Energy Information Administration, etc.).

Those skilled in the art will appreciate that the standard reports may satisfy any number of requirements specified in one or more of the disclosure regulations. For example in the case of the SEC, the standardized reports may include information regarding whether the reservoir volume is economically producible. More specifically, standardized reports for the SEC may include a variety of information including, but not limited to, a reasonable timetable for development; a reasonable assessment of future economics; reasonable market expectations to justify development; available production and transportation facilities; and/or legal, contractual, environmental, and other social and economic concerns that have been evaluated and addressed.

In one or more embodiments, the interface 512 is configured to allow the approver(s) 510 and/or submitter(s) 508 to update the published reservoir volume based on additional oilfield data. In this case, the standardized reports may be subsequently updated to reflect the modifications to the published reservoir volume.

The reporting module 510 may be configured to present oilfield data associated with a wellsite as output. More specifically, the reporting module 510 may be configured to present reservoir volume and information. The reporting module 510 may be configured to accept a variety of user configurations (e.g., type of report, selected reservoirs, date range for the report, recipients of the report, etc.) for a report.

In some cases, the oilfield tracking tool 502 may be configured to authenticate input from users using the security module 514. For example, the security module 514 may be used to authenticate reservoir volume submissions from submitter(s) 508. In another example, the security module 514 may be used to authenticate approvals or disapprovals of reservoir volumes by approver(s) 510. The security module 514 may be configured to authenticate users using a company directory (e.g., Lightweight Directory Access Protocol (LDAP), Active Directory, etc.). In another example, the security module 514 may be configured to authenticate users based on security credentials received from a security device (e.g., smart card, etc.).

Those skilled in the art will appreciate that the security module 514 may be configured to monitor activities of submitter(s) 508 and/or approver(s) 510. For example, the security module 514 may monitor the generation and updating of a reservoir volume. In this example, the audit information obtained by the security module 514 may be used to verify that only authorized users have provided input for the reservoir volume. In another example, a submitter's 508 information may be logged when the submitter submits a reservoir volume. In another example, an approver's 510 information may be logged when the approver 510 approves or disapproves a reservoir volume. The monitored activities may be stored in the data repository 518.

The interface 512 may also be configured to send notifications (e.g., notification of submissions, notification of approval, notification of disapproval, etc.) and display the user interface. For example, the interface 512 may send a notification that a reservoir volume has been submitted to approver(s) 510. A notification may be transmitted as electronic mail, short message service (SMS) message, and/or some other form of communication. The interface 512 may also receive data from a data file (i.e., an extensible markup language XML file, a dBase file, or some other data file format). In this case, the data may be immediately incorporated into the data repository 518.

The data repository 518 may be configured to store data for the oilfield tracking tool 502. For example, the interface 512 may be configured to store data related to reservoirs in the data repository 518. In one or more embodiments, the data may be stored in a format available for use in real-time (e.g., information is updated at approximately the same rate the information is received). The data may be persisted in the file system (e.g., as an extensible markup language XML file) or in a database. The system 500 may determine which storage is the most appropriate to use for a specific portion of data and store the data in a manner enabling the automatic flow of the data through the remainder of the system 500 in a seamless and integrated fashion. The system 500 may also facilitate manual and automated workflows (e.g., reservoir volume approval procedure, etc.) based upon the persisted data.

In some cases, the oilfield tracking tool 502 may be configured to interact with external application(s) 506. Examples of external application(s) 506 include, but are not limited to, an economic modeling application, a financial modeling application, and a risk analysis application. In some cases, reservoir volumes and/or reservoir information may be transmitted to the external application(s) 506 after they have been approved.

Figure 6:
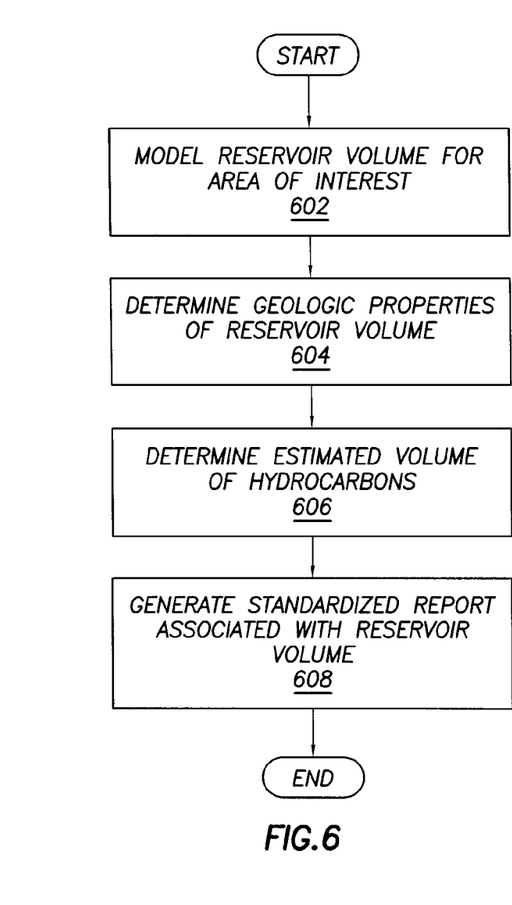
FIGS. 6-7 show exemplary flow charts depicting methods for performing an oilfield operation.

FIG. 6 shows a flow chart depicting a method for publishing reservoir information. The method may be performed using, for example, the system of FIGS. 4 & 5. The method may involve modeling a reservoir volume for an area of interest (602), determining geologic properties of the reservoir volume (604), determining the effective volume of hydrocarbons in the reservoir volume (606), and generating standardized reports associated with the reservoir volume (608).

A reservoir volume may be generated for an area of interest (602). More specifically, a reservoir volume may be generated based on oilfield data acquired from a wellsite. For example, a reservoir volume may be generated based on seismic data obtained by a seismic truck, such as that described in FIG. 1.1.

Next, geologic properties of the reservoir volume may be determined (604). For example, a user may specify geologic properties for the reservoir volume using a modeling tool as described in FIG. 4. In another example, geologic properties may be determined based on oilfield data acquired at sensors, such as those described in FIGS. 1.1-1.4.

Estimated hydrocarbon volumes may then be determined using the reservoir volume (606). More specifically, a user may analyze the reservoir volume to generate an estimated hydrocarbon volume. For example, an estimated hydrocarbon volume may be generated by applying a stochastic methodology using probabilistic variables to control structure, reservoir shape, and reservoir properties. In some cases, the user may generate a number of estimated hydrocarbon volumes based on an analysis of the reservoir volume.

A standardized report may then be generated for the reservoir volume (608). More specifically, the reservoir volume, including the estimated hydrocarbon volume(s), may be submitted for approval and publication. Once the reservoir volume is approved by the appropriate users, the standardized report may be generated for publication. In this case, the publication of the standardized reports may satisfy regulatory disclosure requirements such as those of the SEC and Energy Information Administration.

The steps of the method in FIG. 6 are depicted in a specific order. However, it will be appreciated that the steps may be performed simultaneously or in a different order or sequence.

Figure 7:
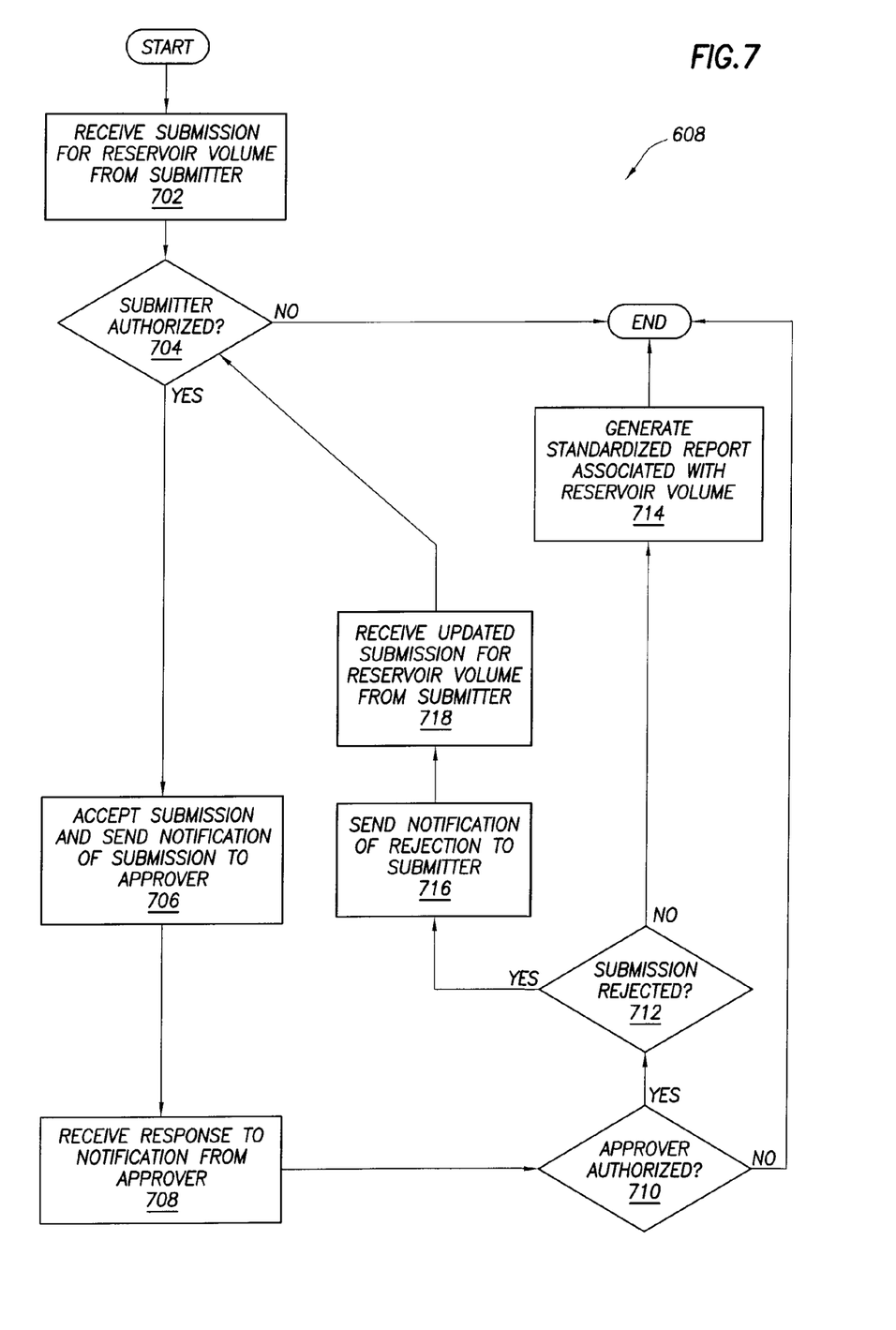

FIG. 7 shows a flow chart depicting a method for publishing a reservoir volume. The method may be performed using, for example, the system of FIG. 5. Further, the method may describe the method steps performed in 608 of FIG. 6.

Initially, a submission for a reservoir volume may be received from a submitter (702). The submitter may be the same as the submitter(s) described in FIG. 5. Further, in one example, the submission may be a new reservoir volume. In another example, the submission may be an update to a stored reservoir volume. As described in FIG. 6, the reservoir volume may include estimated hydrocarbon volume(s) for the reservoir.

At this stage, a determination may be made as to whether the submitter is authorized to provide the submission (704). More specifically, the security credentials of the submitter may be verified to ensure the submitter is authorized to provide the submission. For example, the submitter may be authorized to submit new reservoir models. In another example, the submitter may only be authorized to perform updates on a stored reservoir volume.

If the submitter is not authorized to provide the submission, the submission may be ignored and the process may end. If the submitter is authorized to provide the submission, the submission may be accepted (706). Simultaneous or subsequent to accepting the submission, a notification of the submission may be sent to approver(s). Approver(s) may be the same as the approver(s) of FIG. 5. Further, the notification may be transmitted as electronic mail, short message service (SMS) message, or some other form of communication. The notification of the submission may also provide functionality for approving the submission. For example, the notification may include a reference to an application that interacts with an oilfield tracking tool as described in FIG. 5.

Next, a response to the notification may then be received from the approver (708). A determination may then be made as to whether the approver is authorized to respond to the notification (710). If the approver is not authorized to respond to the notification, the response may be ignored and the process may end. If the approver is authorized to respond to the notification, the response may be processed to determine whether the approver approved or disapproved the submission (712).

If the submission is disapproved by the approver, a notification of the disapproval may be sent to the submitter (716). The notification of the disapproval may also provide functionality for modifying the submission. For example, the notification of the disapproval may provide functionality for updating the estimated hydrocarbon volumes of the reservoir volume. In some cases, the notification of the disapproval may also include a reason for the disapproval. For example, the approver may specify in the notification of the disapproval that additional information is required before the submission can be approved. Next, a request to update the reservoir volume may be received from the submitter (718). At this stage, the method steps beginning at 704 may be repeated.

If the submission is approved by the approver, a standardized report associated with the reserve volume may be generated (714). For example, the information may be included in the standardized report for publication as described above with respect to the reporting module of FIG. 5. In some cases, the submission may be approved separately by multiple approvers before the reservoir volume is approved for publication. Further, the multiple approvers may be organized in a hierarchy of approvers, where each level of the hierarchy has priority over each of the lower level approvers.

The steps of the method in FIG. 7 are depicted in a specific order. However, it will be appreciated that the steps may be performed simultaneously or in a different order or sequence.

Figure 8:
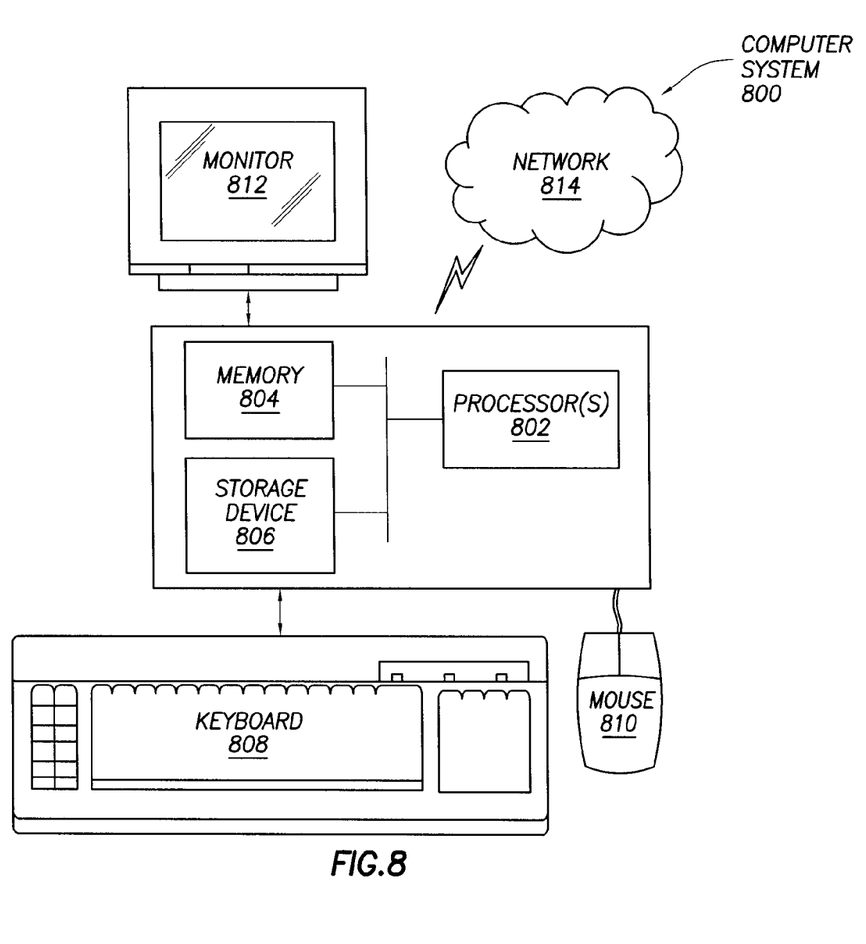
FIG. 8 shows an example computer system on which implementations of various techniques described herein may be implemented in accordance with one or more embodiments.

Embodiments of reservoir management linking (or portions thereof), may be implemented on virtually any type of computer regardless of the platform being used. For example, as shown in FIG. 8, a computer system 800 includes one or more processor(s) 802, associated memory 804 (e.g., random access memory (RAM), cache memory, flash memory, etc.), a storage device 806 (e.g., a hard disk, an optical drive such as a compact disk drive or digital video disk (DVD) drive, a flash memory stick, etc.), and numerous other elements and functionalities typical of today's computers (not shown). The computer system 800 may also include input means, such as a keyboard 808, a mouse 810, or a microphone (not shown). Further, the computer system 800 may include output means, such as a monitor 812 (e.g., a liquid crystal display (LCD), a plasma display, or cathode ray tube (CRT) monitor). The computer system 800 may be connected to a network (814) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system 800 includes at least the minimal processing, input, and/or output means necessary to practice one or more particular embodiments of the reservoir management linking (or portions thereof).

Further, those skilled in the art will appreciate that one or more elements of the aforementioned computer system 800 may be located at a remote location and connected to the other elements over a network. Further, one or more embodiments may be implemented on a distributed system having a plurality of nodes, where each portion may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions for performing one or more embodiments of reservoir management linking may be stored on a computer readable medium such as a compact disc (CD), a diskette, a tape, or any other computer readable storage device.

It will be understood from the foregoing description that various modifications and changes may be made in the preferred and alternative embodiments of reservoir management linking without departing from its true spirit. For example, the method may be performed in a different sequence, and the components provided may be integrated or separate.

This description is intended for purposes of illustration only and should not be construed in a limiting sense. The scope of reservoir management linking should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

While reservoir management linking has been described with respect to a limited number of embodiments, those skilled in the art, having benefit of this disclosure, will appreciate that other embodiments can be devised which do not depart from the scope of reservoir management linking as disclosed herein. Accordingly, the scope of reservoir management linking should be limited only by the attached claims.

What is claimed is:

1. A method of reservoir management linking, comprising:
   generating, by a modeling tool with input from a submitter, a reservoir volume defining a plurality of geologic properties of a reservoir and comprising an estimated hydrocarbon volume of the reservoir, wherein the submitter is responsible for submitting the reservoir volume;
   transmitting, by the modeling tool, the reservoir volume to an oilfield tracking tool;
   receiving, from the submitter and in response to the transmitting, security credentials for the submitter;
   determining, based on the security credentials, that the submitter is authorized to submit the reservoir volume;
   storing, based on determining that the submitter is authorized, the reservoir volume and a log of the transmitting with submitter information on a storage device;
   sending a first notification associated with the reservoir volume to a first approver,
      wherein the first notification is associated with functionality that allows the first approver to approve the reservoir volume, and
      wherein the first approver is at least partially responsible for approving the reservoir volume stored on the storage device;
   receiving approval of the reservoir volume from the first approver;
   sending a second notification associated with the reservoir volume to a second approver, wherein the second approver is at least partially responsible for approving the reservoir volume stored on the storage device;
   receiving approval of the reservoir volume from the second approver; and
   publishing, based on receiving the approval from the first approver and receiving the approval from the second approver, the reservoir volume in a standardized report compliant with a disclosure regulation,
   wherein the first approver and the second approver are arranged in a hierarchy of approvers specifying that the first approver has priority over the second approver.

2. The method of claim 1, wherein each of the first approver and the second approver is a supervisor of the submitter.

3. The method of claim 1, further comprising:
   transmitting information associated with the reservoir volume to an external application for performing an oilfield operation.

4. The method of claim 1, further comprising:
   receiving disapproval of the reservoir volume from a third approver;
   determining that the third approver is authorized to disapprove the reservoir volume; and
   sending notification of the disapproval to the submitter.

5. The method of claim 1, wherein the reservoir volume is submitted from a remote device over a secure connection.

6. The method of claim 1, wherein activities of the submitter and the first approver are monitored.

7. The method of claim 1, further comprising:
   determining that the first approver is authorized to approve the reservoir volume.

8. A system for reservoir management linking, comprising:
   a computer processor;
   a modeling tool configured to:
      generate, with input from a submitter, a reservoir volume defining a plurality of geologic properties of a reservoir and comprising an estimated hydrocarbon volume of the reservoir, wherein the submitter is responsible for submitting the reservoir volume, and
      transmit the reservoir volume to an oilfield tracking tool;
   an oilfield tracking tool executing on the computer processor and configured to:
      receive the reservoir volume from the modeling tool,
      receive, in response to the receiving the reservoir volume, security credentials for the submitter;
      send a first notification associated with the reservoir volume to a first approver, wherein the first notification is associated with functionality that allows the first approver to approve the reservoir volume, and
      send a second notification associated with the reservoir volume to a second approver,
      receive approval of the reservoir volume from the first approver, wherein the first approver is at least partially responsible for approving the reservoir volume,
      receive approval of the reservoir volume from the second approver, wherein the second approver is at least partially responsible for approving the reservoir volume, wherein the first approver and the second approver are arranged in a hierarchy of approvers specifying that the first approver has priority over the second approver;

a security module executing on the computer processor and configured to:
  determine, based on the security credentials, that the submitter is authorized to submit the reservoir;

a data repository configured to store, based on determining that the submitter is authorized, the reservoir volume and a log of the transmitting with submitter information; and a reporting module executing on the computer processor and configured to publish, based on receiving the approval from the first approver and receiving the approval from the second approver, the reservoir volume in a standardized report compliant with a disclosure regulation.

9. The system of claim 8, wherein the oilfield tracking tool is further configured to:
  receive disapproval of the reservoir volume from a third approver; and
  determine that the third approver is authorized to disapprove the reservoir volume and sending notification of the disapproval to the submitter.

10. The system of claim 8, wherein the modeling tool executes on a remote device.

11. The system of claim 8, wherein the security module is further configured to monitor the activities of the submitter and the first approver.

12. The system of claim 8, wherein the oilfield tracking tool is further configured to transmit the information associated with the reservoir volume to an external application for performing an oilfield operation.

13. The system of claim 8, wherein the security module is further configured to:
  determine that the first approver is authorized to approve the reservoir volume.

14. A computer readable medium storing instructions for reservoir management linking, the instructions when executed causing a processor to:
  generate, with input from a submitter, a reservoir volume defining a plurality of geologic properties of a reservoir and comprising an estimated hydrocarbon volume of the reservoir, wherein the submitter is responsible for submitting the reservoir volume;
  transmit the reservoir volume to an oilfield tracking tool;
  receive, from the submitter and in response to the transmitting, security credentials for the submitter;
  determine, based on the security credentials, that the submitter is authorized to submit the reservoir volume;
  store, based on determining that the submitter is authorized, the reservoir volume and a log of the transmitting with submitter information on a storage device;
  send a first notification associated with the reservoir volume to a first approver,
    wherein the first notification is associated with functionality that allows the first approver to approve the reservoir volume, and
    wherein the first approver is at least partially responsible for approving the reservoir volume stored on the storage device;
  receive approval of the reservoir volume from the first approver;
  publish information associated with the reservoir volume;
  send a second notification associated with the reservoir volume to a second approver, wherein the second approver is at least partially responsible for approving the reservoir volume stored on the storage device;
  receive approval of the reservoir volume from the second approver; and
  publish, based on receiving the approval from the first approver and receiving the approval from the second approver, the reservoir volume in the standardized report compliant with a disclosure regulation,
    wherein the first approver and the second approver are arranged in a hierarchy of approvers specifying that the first approver has priority over the second approver.

15. The computer readable medium of claim 14, the instructions further causing a processor to:
  transmit information associated with the reservoir volume to an external application for performing an oilfield operation.

16. The computer readable medium of claim 14, the instructions further causing a processor to:
  receive disapproval of the reservoir volume from a third approver;
  determine that the third approver is authorized to disapprove the reservoir volume; and
  send notification of the disapproval to the submitter.

17. The computer readable medium of claim 14, the instructions further causing a processor to:
  determine that the first approver is authorized to approve the reservoir volume.

\* \* \* \* \*